US010816480B2

(12) United States Patent
Jeang et al.

(10) Patent No.: US 10,816,480 B2
(45) Date of Patent: Oct. 27, 2020

(54) METHOD OF DETECTING A DEFECT ON A SUBSTRATE, APPARATUS FOR PERFORMING THE SAME AND METHOD OF MANUFACTURING SEMICONDUCTOR DEVICE USING THE SAME

(71) Applicant: Samsung Electronics Co., Ltd., Suwon-si (KR)

(72) Inventors: Eun-Hee Jeang, Paju-si (KR); Aleksandr Shorokhov, Tula (RU); Anton Medvedev, Korolev (RU); Maksim Riabko, Dolgoprudny (RU); Sang-Woo Bae, Seoul (KR); Akinori Okubo, Hwaseong-si (KR); Sang-Min Lee, Yongin-si (KR); Seong-Keun Cho, Suwon-si (KR); Won-Don Joo, Incheon (KR)

(73) Assignee: SAMSUNG ELECTRONICS CO., LTD., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/364,251

(22) Filed: Mar. 26, 2019

(65) Prior Publication Data

US 2020/0088649 A1   Mar. 19, 2020

(30) Foreign Application Priority Data

Sep. 18, 2018   (KR) .................. 10-2018-0111663

(51) Int. Cl.
*G01N 21/88*      (2006.01)
*G01N 21/21*      (2006.01)

(52) U.S. Cl.
CPC ........ *G01N 21/8806* (2013.01); *G01N 21/21* (2013.01); *G01N 2021/8848* (2013.01); *G01N 2201/0683* (2013.01)

(58) Field of Classification Search
CPC .......... G01N 2021/8848; G01N 21/21; G01N 21/8806; G01N 2201/0683
USPC ............... 356/237.1–237.6, 239.1–239.8
See application file for complete search history.

(56) References Cited

U.S. PATENT DOCUMENTS

| 5,294,289 A * | 3/1994 | Heinz ............... B24B 37/013 118/712 |
| 6,791,099 B2 | 9/2004 | Some et al. |
| 7,982,188 B2 | 7/2011 | Shinada et al. |
| 9,632,020 B2 | 4/2017 | Hunt et al. |
| 2015/0330908 A1* | 11/2015 | Koldiaev .......... G01R 31/2601 356/237.2 |
| 2016/0131594 A1 | 5/2016 | Koldiaev et al. |
| 2016/0240993 A1* | 8/2016 | Tokuhisa ............ H01S 3/10015 |
| 2019/0107495 A1* | 4/2019 | Shafiei .............. G01N 21/8422 |

FOREIGN PATENT DOCUMENTS

| JP | 7-260702 A | 10/1995 |
| JP | 2010-085225 A | 4/2010 |

\* cited by examiner

*Primary Examiner* — Tri T Ton
(74) *Attorney, Agent, or Firm* — Muir Patent Law, PLLC

(57) ABSTRACT

In a method of detecting a defect on a substrate, an incident beam may be radiated to a surface of the substrate to generate reflected light beams. A second harmonic generation (SHG) beam among the reflected light beams may be detected. The SHG beam may be generated by a defect on the substrate. A nano size defect may be detected by examining the SHG beam.

19 Claims, 11 Drawing Sheets

METHOD OF DETECTING A DEFECT ON A SUBSTRATE, APPARATUS FOR PERFORMING THE SAME AND METHOD OF MANUFACTURING SEMICONDUCTOR DEVICE USING THE SAME

CROSS-RELATED APPLICATION

This application claims priority under 35 USC § 119 to Korean Patent Application No. 2018-0111663, filed on Sep. 18, 2018 in the Korean Intellectual Property Office (KIPO), the contents of which are herein incorporated by reference in their entirety.

BACKGROUND

1. Field

Example embodiments relate to a method of detecting a defect on a substrate and an apparatus for performing the same. More particularly, example embodiments relate to a method of detecting a nano size defect on a substrate, and an apparatus for performing the method. The present disclosure is also related to a method of manufacturing a semiconductor device using the apparatus and/or the defect detecting method.

2. Description of the Related Art

As semiconductor devices have become highly integrated, a size of a defect causing an error of the semiconductor devices may become smaller. Small size defects, which may not cause an error of a conventional semiconductor device, may cause an error in a highly integrated semiconductor device.

Thus, a method and an apparatus for accurately detecting nano size defects may be beneficial for manufacturing semiconductor devices. Further, a method and an apparatus for rapidly detecting the nano size defects may also be beneficial for a mass production of semiconductor devices.

SUMMARY

Example embodiments provide a method of accurately and rapidly detecting a nano size defect on a substrate.

Example embodiments also provide an apparatus for performing the above-mentioned method.

According to example embodiments, there may be provided a method of detecting a defect on a substrate. In the method of detecting the defect on the substrate, an incident light beam may be radiated to a surface of the substrate to generate reflected light beams. A second harmonic generation (SHG) beam among the reflected light beams may be detected. The SHG beam may be generated by a defect on the substrate.

According to example embodiments, there may be provided a method of detecting a defect on a substrate. In the method of detecting the defect on the substrate, an incident beam may be radiated to a surface of the substrate to generate reflected beams. A reflected beam having a frequency band different from a frequency band of an SHG beam among reflected beams may be removed. A first portion of the SHG beam may be removed. The first portion may have a polarization direction different from that of other portions of the SHG beam. A second portion of the SHG beam may be removed. The second portion may be generated by the surface of the substrate.

According to example embodiments, there may be provided an apparatus for detecting a defect on a substrate. The apparatus may include a light source, a filter and a detector. The light source may be configured to generate a light beam that results in an incident beam incident to a surface of the substrate to form reflected beams. The filter may be configured to allow an SHG beam to pass through the filter. The SHG beam may be generated by a defect. The detector may be configured to receive the SHG beam after the SHG beam passes through the filter.

According to example embodiments, there may be provided an apparatus for detecting a defect on a substrate. The apparatus may include a light source, a dichroic mirror, an analyzer and a detector. The light source may be configured to generate a light beam that results in an incident beam incident to a surface of the substrate to form reflected beams. The dichroic mirror may be configured to allow an SHG beam to pass through the dichroic mirror. The SHG beam may be generated by the defect. The analyzer may be configured to remove a beam having a polarization direction different from that of the SHG beam after the SHG beam passes through the dichroic mirror. The detector may be configured to receive the SHG beam after the SHG bema passes through the analyzer.

According to example embodiments, only the SHG beam generated by the defect on the substrate may be detected among the reflected beams. Thus, a nano size defect may be accurately and rapidly detected by examining the SHG beam.

BRIEF DESCRIPTION OF THE DRAWINGS

Example embodiments will be more clearly understood from the following detailed description taken in conjunction with the accompanying drawings.

FIG. 1 is a block diagram illustrating an apparatus for detecting a defect on a substrate in accordance with example embodiments;

FIG. 2 is a flow chart illustrating a method of detecting a defect on a substrate using the apparatus in FIG. 1;

FIG. 3 is a block diagram illustrating an apparatus for detecting a defect on a substrate in accordance with example embodiments;

FIG. 4 is a flow chart illustrating a method of detecting a defect on a substrate using the apparatus in FIG. 3;

FIG. 5 is a block diagram illustrating an apparatus for detecting a defect on a substrate in accordance with example embodiments;

FIG. 6 is a flow chart illustrating a method of detecting a defect on a substrate using the apparatus in FIG. 5;

FIG. 7 is a block diagram illustrating an apparatus for detecting a defect on a substrate in accordance with example embodiments;

FIG. 8 is a block diagram illustrating an apparatus for detecting a defect on a substrate in accordance with example embodiments;

FIG. 9 is a flow chart illustrating a method of detecting a defect on a substrate using the apparatus in FIG. 8;

FIG. 10 is a block diagram illustrating an apparatus for detecting a defect on a substrate in accordance with example embodiments; and FIG. 11 is a flow chart illustrating a method of detecting a defect on a substrate using the apparatus in FIG. 10.

DETAILED DESCRIPTION

Hereinafter, example embodiments will be explained in detail with reference to the accompanying drawings.

Figure 1:
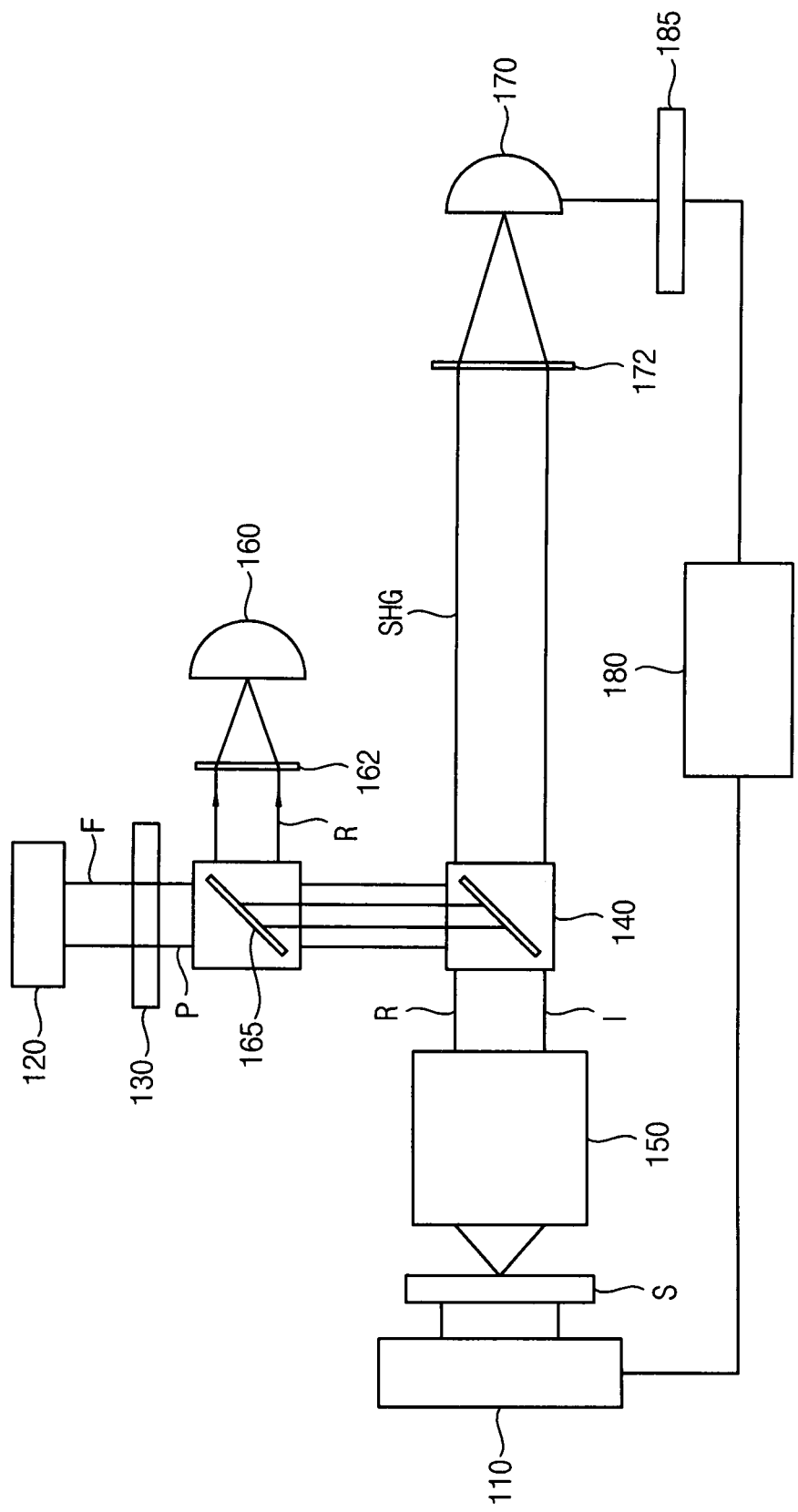
FIGS. 1 to 11 represent non-limiting, example embodiments as described herein.

FIG. 1 is a block diagram illustrating an apparatus for detecting a defect on a substrate in accordance with example embodiments.

Referring to FIG. 1, an apparatus for detecting a defect on a substrate may include a stage 110, a light source 120, a polarizer 130, a filter 140, an objective lens 150, an image sensor 160, a detector 170 and a controller 180.

The stage 110 may support the substrate S. The substrate S may be placed on an upper surface of the stage 110. In example embodiments, the substrate S may be a wafer. Alternatively, the substrate S may be a glass substrate. The stage 110 may be moved in horizontal and vertical directions. Thus, the substrate S on the stage 110 may also be moved in the horizontal and vertical directions.

The light source 120 may generate a fundamental beam F. The fundamental beam F generated from the light source 120 may radiate/emit in a direction substantially parallel to a surface of the substrate S. Thus, the light source 120 may be arranged in a direction substantially perpendicular to the surface of the stage 110. For example, the light source 120 may be placed at an off face position with respect to the surface of the stage 110. For example, the fundamental beam F may be a light beam generated from the light source 120. For example, the fundamental beam may be a laser beam. The fundamental beam F may have a first frequency w. Alternatively, the light source 120 may generate a fundamental beam having at least two frequencies. The fundamental beam F may include a spot beam. For example, the spot beam may radiate in a limited area and the boundary of the spot beam may have a circular shape in cross-sectional view crossing perpendicularly with respect to a proceeding direction of the spot beam.

Embodiments may be illustrated herein with idealized views (although relative sizes may be exaggerated for clarity). It will be appreciated that actual implementation may vary from these exemplary views depending on manufacturing technologies and/or tolerances. Therefore, descriptions of certain features using terms such as "same," "equal," and geometric descriptions such as "planar," "coplanar," "cylindrical," "square," "parallel," "perpendicular," etc., as used herein when referring to orientation, layout, location, shapes, sizes, amounts, or other measures, encompass acceptable variations from exact identicality, including nearly identical layout, location, shapes, sizes, amounts, or other measures within acceptable variations that may occur, for example, due to manufacturing processes. The term "substantially" may be used herein to emphasize this meaning, unless the context or other statements indicate otherwise.

The filter 140 may be arranged over the stage 110. The filter 140 may be located at a position to which the fundamental beam F generated from the light source 120 may be incident.

In example embodiments, the filter 140 may include a dichroic mirror. The dichroic mirror may include a mirror and a dielectric layer coated on the mirror. The dichroic mirror may allow a beam having a specific frequency band to pass therethrough. In contrast, the dichroic mirror may not allow beams having frequencies except for the specific frequency to pass therethrough. The dichroic mirror used in example embodiments may reflect a beam having the first frequency w. In contrast, the dichroic mirror used in example embodiments may allow a beam having a second frequency 2w of two times the first frequency w to pass therethrough. For example, the dichroic mirror used in example embodiments may not allow the fundamental beam F having the first frequency w to pass therethrough.

The filter 140, e.g., the dichroic mirror, may be inclined with respect to a radiation/transmission direction of the fundamental beam F. Thus, the filter 140 may change the radiation/transmission direction of the fundamental beam F generated from the light source 120 toward the surface of the substrate S at an angle of about 90°. Therefore, the fundamental beam F may results in an incident beam I incident to the surface of the substrate S in a direction substantially perpendicular to the surface of the substrate S.

The polarizer 130 may be arranged between the light source 120 and the filter 140. The polarizer 130 may polarize the fundamental beam F generated from the light source 120 to form a polarized beam P having a specific polarization direction. For example, the polarized beam P may be a polarized light beam including a polarized light.

The polarized beam P may be incident to the filter 140. Because the polarized beam P may have the first frequency w, the filter 140, e.g., the dichroic mirror, may change a path of the polarized beam P toward and to be incident to the surface of the substrate S at an angle of about 90°. For example, the polarized beam P may be reflected from the filter 140 (e.g., from the dichroic mirror) toward the objective lens 150.

The objective lens 150 may be arranged between the filter 140 and the stage 110. An incident beam I reflected from the filter 140 may be incident to the surface of the substrate S disposed on the stage 110 in the direction substantially perpendicular to the surface of the substrate S. For example, the surface of the substrate S may be irradiated with the incident beam I in a substantially perpendicular direction, and the incident beam I may be reflected from the surface of the substrate S. For example, the incident beam I may be an incident light beam such as a laser beam.

Reflected beams R may be generated/reflected from the surface of the substrate S to which the incident beam I may be incident. For example, the reflected beams R may be reflected light beams formed by a reflection of the incident beam I from the surface of the substrate S. The reflected beams R may have the first frequency w, the second frequency 2w, a third frequency 3w, etc. A reflected beam R having the first frequency w may be generated/reflected from the surface of the substrate S. In contrast, a reflected beam R having the second frequency 2w of two times of the first frequency w may be generated from defects on the substrate S. For example, the reflected beam R having the second frequency 2w may correspond to a second harmonic generation (SHG) beam.

As mentioned above, the filter 140 may allow only the SHG beam among the reflected beams R to pass therethrough. For example, the reflected beams R having the first frequency w and the third frequency 3w may not pass through the filter 140. Only the reflected beam R having the second frequency 2w, e.g., the SHG beam may pass through the filter 140.

The reflected beams R not passing through the filter 140 may be reflected from the filter 140. The reflected beams R from the filter 140 may be incident to the image sensor 160 through a reflective mirror 165 and a lens 162.

The image sensor 160 may be used to focus the incident beam I incident to the surface of the substrate S by using the reflected beams R. For example, the image sensor 160 may recognize a focusing position of the reflected beam R. Because the frequency of the reflected beam R may be substantially the same as that of the incident beam I, the focusing position recognized by the image sensor 160 may correspond to a focusing position of the incident beam I. In certain example embodiments, the image sensor 160 may include a CMOS image sensor.

The focusing position of the reflected beam R recognized by the image sensor 160 may be transmitted to the controller 180. The controller 180 may move the stage 110 in the horizontal direction and/or the vertical direction in accordance with the focusing position of the reflected beam R to focus the incident beam I on the surface of the substrate S.

The detector 170 may detect the SHG beam which has passed through the filter 140. The SHG beam may be incident to the detector 170 through a lens 172. When the detector 170 may detect the SHG beam, a detection signal detected by the detector 170 may be transmitted to the controller 180. The detector 170 may detect the SHG beam using an area step manner or an area scan manner. For example, the area scan manner may obtain the SHG beam information by using a scanning process through a predetermined area. For example, the area step manner may obtain the SHG beam information by using a stepper process, e.g., by obtaining a plurality of images corresponding a plurality of sub-regions of the SHG beam. The detector 170 may include a photo multiplier tube (PMT), an image sensor, a CCD camera, etc. For example, the photo multiplier tube may include a plurality of vacuum phototubes. The CCD camera may include an electron multiplying (EM) CCD camera. In certain embodiments, an amplifier 185 may amplify the detection signal before the detection signal is transmitted to the controller 180.

The controller 180 may analyze the detection signal of the SHG beam to identify defects on the substrate S. In certain embodiments, the SHG beam may include two or more frequencies, the two or more frequencies of the SHG beam may be detected by using the incident beam I, and the controller 180 may identify defects having different sizes and/or different properties, e.g., by using the two or more frequencies of the SHG beam. In certain embodiments, the controller 180 may analyze the SHG beam to obtain information including a position, a size, a property, etc., of the defects.

Figure 2:
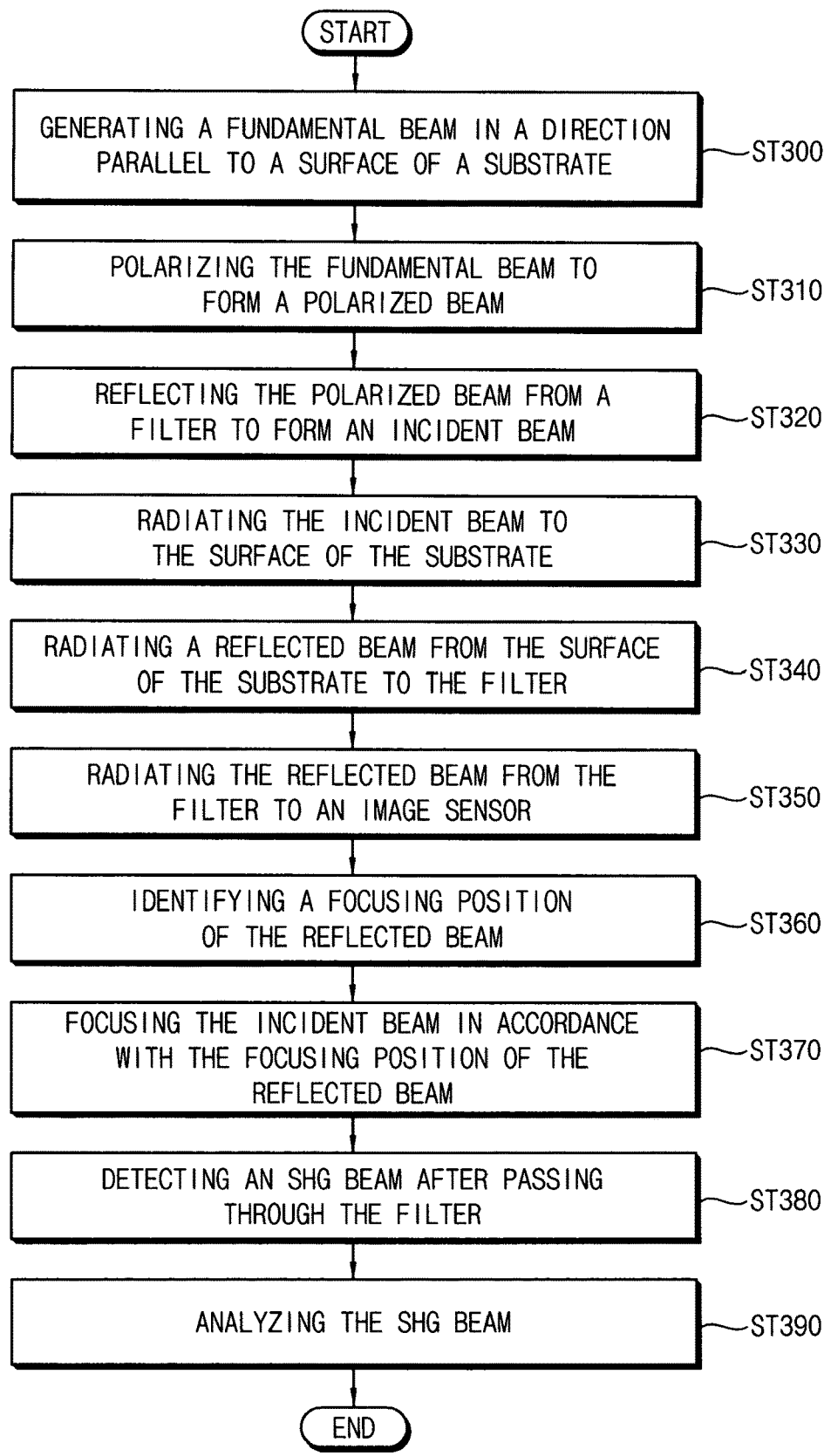

FIG. 2 is a flow chart illustrating a method of detecting a defect on a substrate using the apparatus in FIG. 1.

Referring to FIGS. 1 and 2, in step ST300, the light source 120 may generate the fundamental beam F. The fundamental beam F may radiate/emit in the direction substantially parallel to the surface of the substrate S. The fundamental beam F may have the first frequency w. Alternatively, the fundamental beam F may have at least two frequencies.

In step ST310, the polarizer 130 may polarize the fundamental beam F to form the polarized beam P having the polarization direction. The polarized beam P may be incident to the filter 140.

In step ST320, the filter 140 may reflect the polarized beam P toward the surface of the substrate S to form the incident beam I incident to the surface of the substrate S.

In step ST330, the incident beam I reflected from the filter 140 may pass through the object lens 150. The incident beam I may then be incident to the surface of the substrate S disposed on the stage 110 in the direction substantially perpendicular to the surface of the substrate S. For example, the surface of the substrate S may be irradiated with the incident beam I, and the incident beam I may be incident on the substrate S in a substantially perpendicular direction to the surface of the substrate S and may be reflected from the surface of the substrate S.

In step ST340, the reflected beam R may be generated/reflected from the surface of the substrate S. The reflected beam R may be incident to the filter 140. The filter 140 may allow only the SHG beam among the reflected beams R to pass therethrough. For example, the reflected beams R having the first frequency w and the third frequency 3w may not pass through the filter 140. Only the reflected beam R having the second frequency 2w, e.g., the SHG beam may pass through the filter 140.

In step ST350, the reflected beam R not passing through the filter 140 may be reflected from the filter 140. The reflected beam R from the filter 140 may be incident to the image sensor 160 through the reflective mirror 165 and the lens 162.

In step ST360, the image sensor 160 may focus, e.g., in combination with the controller 180, the incident beam I by using the reflected beam R. The image sensor 160 may recognize the focusing position of the reflected beam R. The focusing position of the reflected beam R obtained by the image sensor 160 may then be transmitted to the controller 180.

In step ST370, the controller 180 may move the stage 110 in the horizontal direction and/or the vertical direction in accordance with the focusing position to focus the incident beam I on the surface of the substrate S.

In step ST380, the detector 170 may detect the SHG beam which has passed through the filter 140. The detection signal detected by the detector 170 may then be transmitted to the controller 180. The detector 170 may detect the SHG beam using the area step manner or the area scan manner. The amplifier 185 may amplify the detection signal before the detection signal is transmitted to the controller 180.

In step ST390, the controller 180 may analyze the detection signal of the SHG beam to identify defects on the substrate S. In certain embodiments, the SHG beam may include two or more frequencies, the two or more frequencies of the SHG beam may be detected by using the incident beam I, and the controller 180 may identify defects having different sizes and/or different properties, e.g., by using different frequencies of the SHG beam. In certain embodiments, the controller 180 may analyze the SHG beam to obtain information including a position, a size, a property, etc., of the defects.

Figure 3:
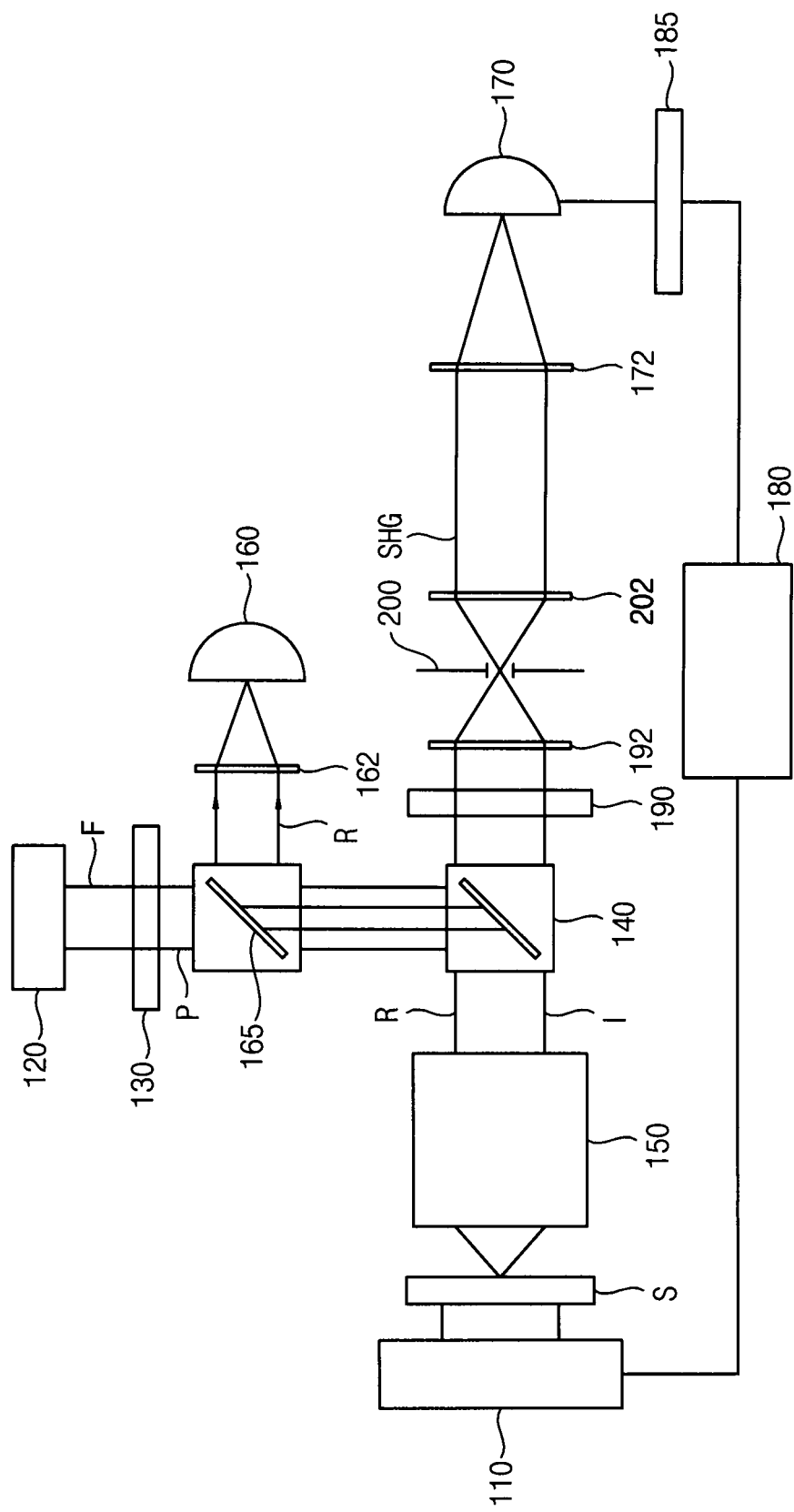

FIG. 3 is a block diagram illustrating an apparatus for detecting a defect on a substrate in accordance with example embodiments.

An apparatus for detecting a defect on a substrate in accordance with example embodiments may include elements substantially the same as those of the apparatus in FIG. 1 except for further including an analyzer 190 and a spatial filter 200. Thus, the same reference numerals may refer to the same elements and any further illustrations with respect to the same elements may be omitted herein for brevity.

Referring to FIG. 3, as mentioned above, the filter 140 may allow the SHG beam having the second frequency 2w caused/generated by the defect to pass through the filter 140. However, the SHG beam passing through the filter 140 may include a beam not caused by the defect. For example, the SHG beam passing through the filter 140 may include a beam generated from the surface of the substrate S. This beam may have a polarization direction different from that of the SHG beam generated by the defect.

The analyzer 190 may be arranged between the filter 140 and the detector 170. The analyzer 190 may remove the beam having the different polarization direction from the SHG beam passing through the filter 140. Thus, the SHG beam passing through the analyzer 190 may have substantially the same polarization direction.

The spatial filter 200 may be arranged between the analyzer 190 and the detector 170. The SHG beam which has passed through the analyzer 190 may be concentrated on the spatial filter 200 by a lens 192. The spatial filter 200 may remove noise from the SHG beam which has passed through the analyzer 190. For example, the SHG beam passing through the analyzer 190 may have a frequency slightly higher or lower than the second frequency $2w$ as well as the second frequency $2w$. A portion of the SHG beam having the frequency higher or lower than the second frequency $2w$ may be the noise, and the noise may decrease an image quality. The spatial filter 200 may remove the noise such as the portion of the SHG beam having the frequency slightly higher or lower than the second frequency $2w$.

The SHG beam which has passed through the spatial filter 200 may be transformed to be a parallel SHG beam by a lens 202. The parallel SHG beam may be incident to the detector 170 through the lens 172.

Figure 4:
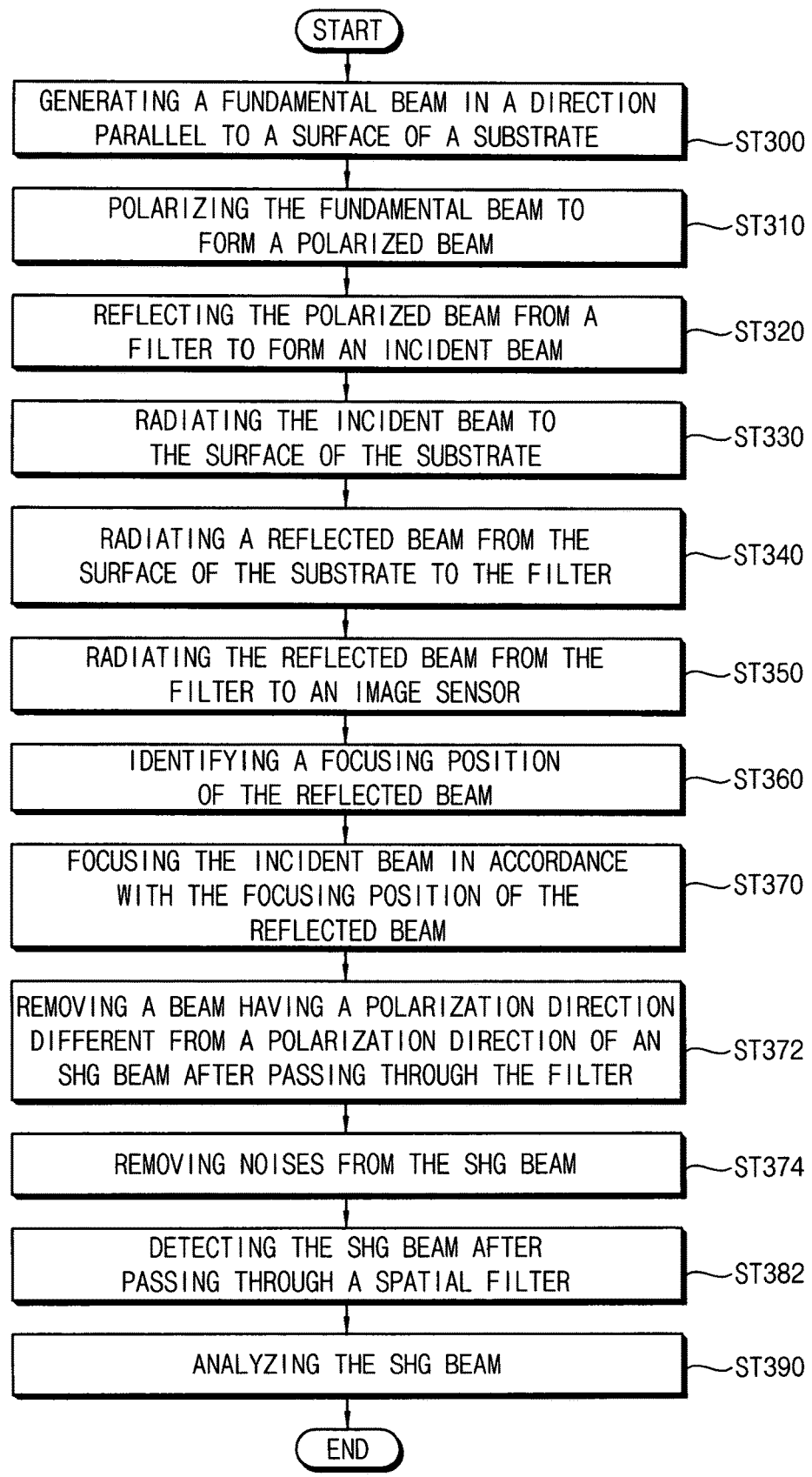

FIG. 4 is a flow chart illustrating a method of detecting a defect on a substrate using the apparatus in FIG. 3.

Referring to FIGS. 3 and 4, steps ST300 to ST370 illustrated with reference to FIG. 2 may be sequentially performed.

In step ST372, the analyzer 190 may remove the beam having the polarization direction different from that of the SHG beam generated by the defect both of which have passed through the filter 140. Thus, the SHG beam passing through the analyzer 190 may have the same polarization direction. For example, the SHG beam having passed through the analyzer 190 may have a predetermined polarization direction corresponding to the polarization direction of the analyzer 190. For example the predetermined polarization direction may be the same as the polarization direction of the SHG beam generated by the defect.

In step ST374, the spatial filter 200 may remove the noise from the SHG beam which has passed through the analyzer 190. For example, the SHG beam passing through the analyzer 190 may have a frequency slightly higher or lower than the second frequency $2w$ as well as the second frequency $2w$. A portion of the SHG beam having the frequency higher or lower than the second frequency $2w$ may be the noise, and the noise may decrease an image quality. The spatial filter 200 may remove the noise such as the portion of the SHG beam having the frequency slightly higher or lower than the second frequency $2w$ to improve an image quality obtained by the detector 170.

In step ST382, the detector 170 may detect the SHG beam which has passed through the spatial filter 200. The detection signal detected by the detector 170 may then be transmitted to the controller 180. The detector 170 may detect the SHG beam using the area step manner or the area scan manner. The amplifier 185 may amplify the detection signal before the detection signal is transmitted to the controller 180.

In step ST390, the controller 180 may analyze the detection signal of the SHG beam to identify the defect on the substrate S. In certain embodiments, the SHG beam may include two or more frequencies, the two or more frequencies of the SHG beam may be detected by using the incident beam I, and the controller 180 may identify defects having different sizes and/or different properties, e.g., by using different frequencies of the SHG beam. In certain embodiments, the controller 180 may analyze the SHG beam to obtain information including a position, a size, a property, etc., of the defects.

Figure 5:
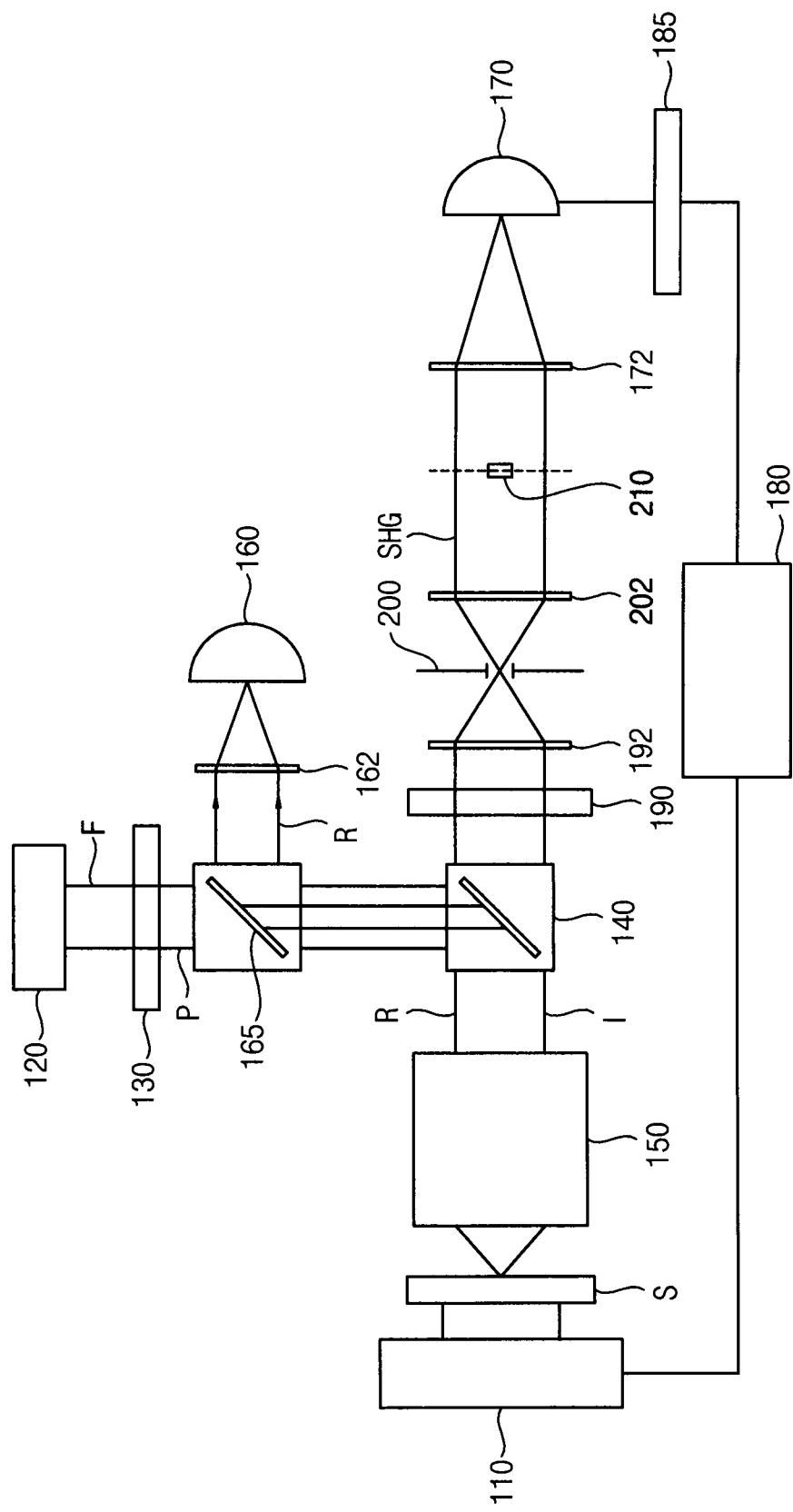

FIG. 5 is a block diagram illustrating an apparatus for detecting a defect on a substrate in accordance with example embodiments.

An apparatus for detecting a defect on a substrate in accordance with example embodiments may include elements substantially the same as those of the apparatus in FIG. 3 except for further including a blocking plate 210. Thus, the same reference numerals may refer to the same elements and any further illustrations with respect to the same elements may be omitted herein for brevity.

Referring to FIG. 5, the blocking plate 210 may be arranged between the spatial filter 200 and the detector 170. The blocking plate 210 may block a central portion of the SHG beam incident from the spatial filter 200 toward the detector 170.

The central portion of the SHG beam passing through the spatial filter 200 may partially include a beam generated from the surface of the substrate S, and not generated from a defect. Because the beam generated from the surface of the substrate S may be noise of the SHG beam, the blocking plate 210 may block the central portion of the SHG beam. For example, the blocking plate 210 may prevent the central portion of the SHG beam incident from the spatial filter 200 from passing through the blocking plate 210. Thus, the central portion of the SHG beam may not be incident to the detector 170. For example, the blocking plate 210 may prevent the central portion of the SHG beam from transmitting to the detector 170. For example, the blocking plate 210 may remove the central portion of the SHG beam from the SHG beam so that the other portion of the SHG beam may be received by the detector 170.

Figure 6:
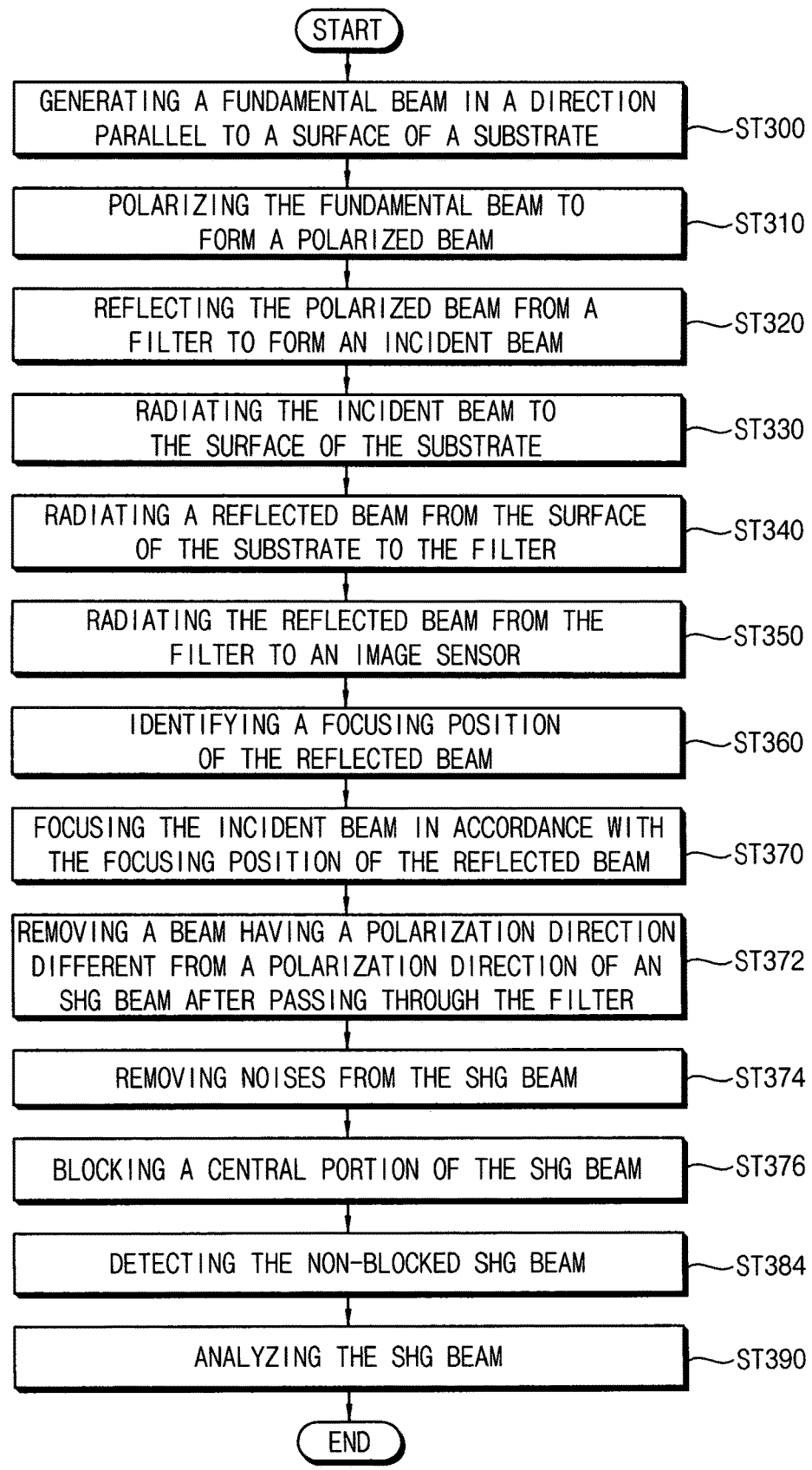

FIG. 6 is a flow chart illustrating a method of detecting a defect on a substrate using the apparatus in FIG. 5.

Referring to FIGS. 5 and 6, steps ST300 to ST374 illustrated with reference to FIG. 4 may be sequentially performed.

In step ST376, the blocking plate 210 may block the central portion of the SHG beam which has passed through the spatial filter 200. Thus, the central portion of the SHG beam may not be incident to the detector 170

In step ST384, the detector 170 may detect the SHG beam not blocked by the blocking plate 210. The detection signal detected by the detector 170 may then be transmitted to the controller 180. The detector 170 may detect the SHG beam using the area step manner or the area scan manner. The amplifier 185 may amplify the detection signal before the detection signal is transmitted to the controller 180.

In step ST390, the controller 180 may analyze the detection signal of the SHG beam to identify the defect on the substrate S. In certain embodiments, the SHG beam may include two or more frequencies, the two or more frequencies of the SHG beam may be detected by using the incident beam I, and the controller 180 may identify defects having different sizes and/or different properties, e.g., by using different frequencies of the SHG beam. In certain embodiments, the controller 180 may analyze the SHG beam to obtain information including a position, a size, a property, etc., of the defects.

Figure 7:
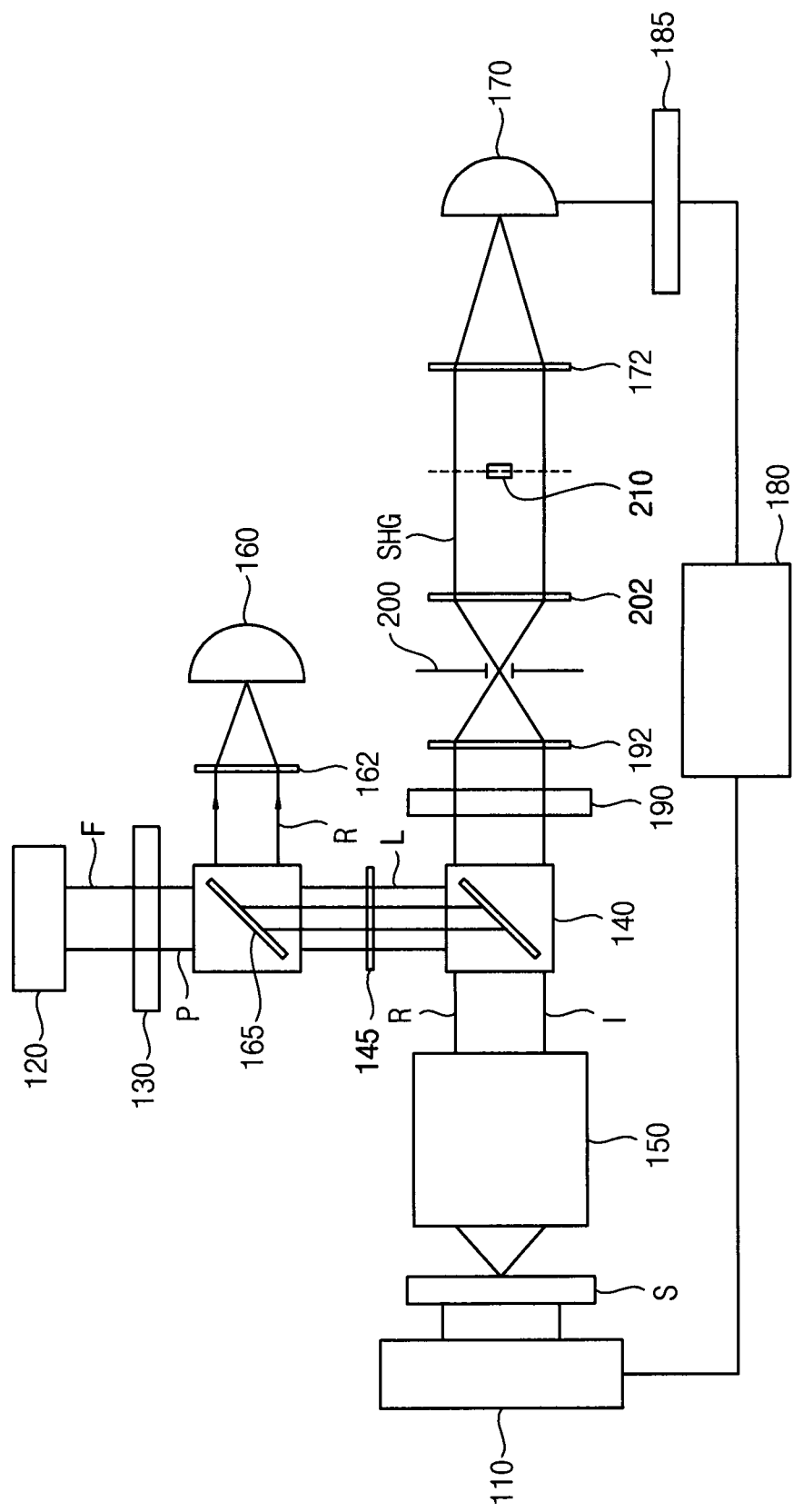

FIG. 7 is a block diagram illustrating an apparatus for detecting a defect on a substrate in accordance with example embodiments.

An apparatus for detecting a defect on a substrate in accordance with example embodiments may include elements substantially the same as those of the apparatus in FIG. 3 except for further including a cylindrical lens 145. Thus, the same reference numerals may refer to the same elements and any further illustrations with respect to the same elements may be omitted herein for brevity.

Referring to FIG. 7, the detecting apparatus of this example embodiment may use a line beam L. In order to form the line beam L, the cylindrical lens 145 may be arranged between the polarizer 130 and the filter 140. The cylindrical lens 145 may convert the polarized beam formed by the polarizer 130 into the line beam L. Thus, the line beam L formed by the cylindrical lens 145 may be incident to the filter 140. For example, the line beam L may have an elongated cross-section in a plane perpendicular to a proceeding direction of the line beam L.

A method of detecting a defect on a substrate in accordance with this example embodiment may be substantially the same as the method illustrated with reference to FIG. 6 except for using the line beam L. Thus, any further illustrations with respect to the method of this example embodiment may be omitted herein for brevity.

Alternatively, the cylindrical lens 145 may be applied to the apparatus in FIG. 1 or the apparatus in FIG. 3.

Figure 8:
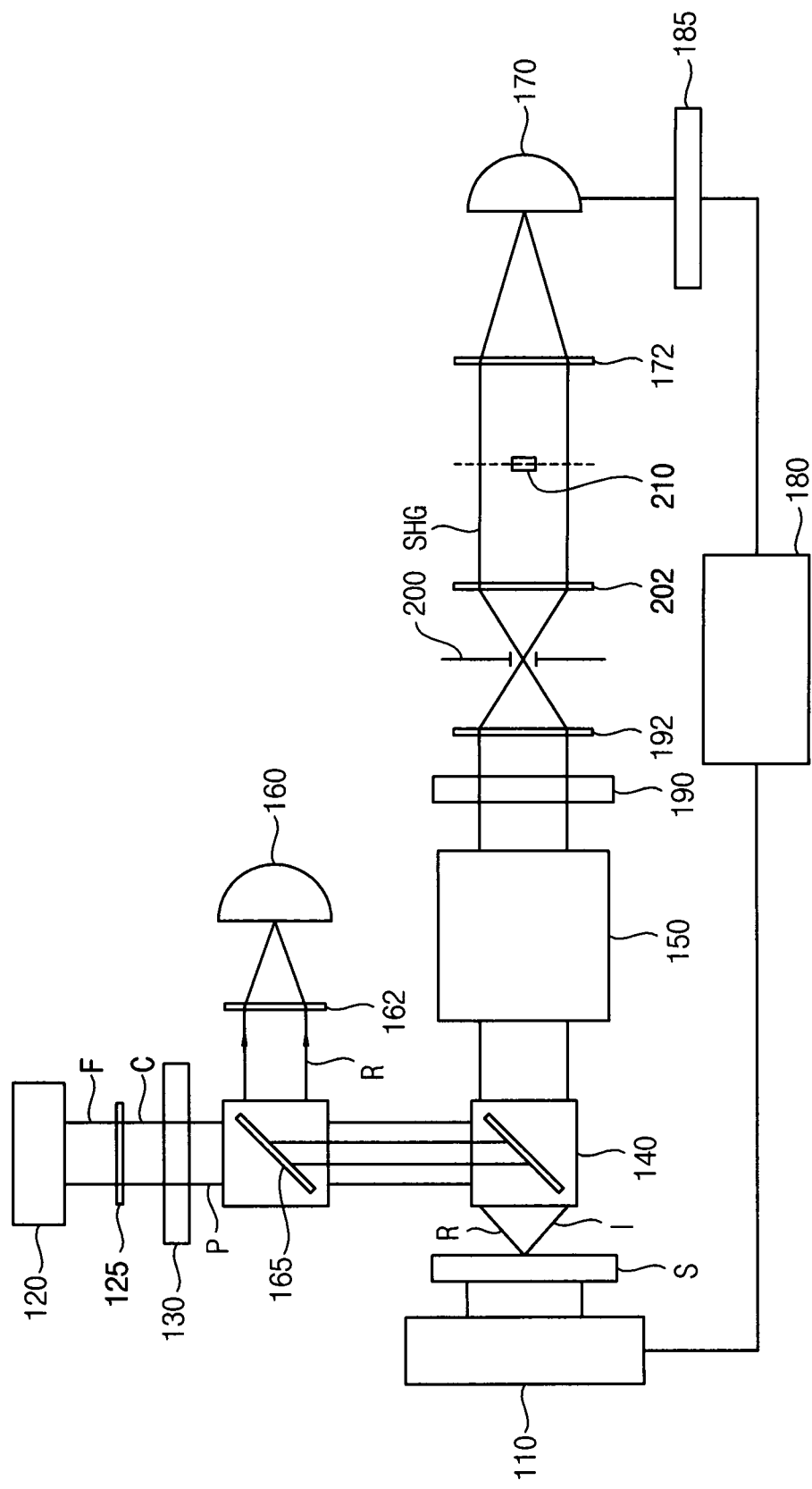

FIG. 8 is a block diagram illustrating an apparatus for detecting a defect on a substrate in accordance with example embodiments.

An apparatus for detecting a defect on a substrate in accordance with example embodiments may include elements substantially the same as those of the apparatus in FIG. 5 except for further including a collimating lens 125. Thus, the same reference numerals may refer to the same elements and any further illustrations with respect to the same elements may be omitted herein for brevity.

Referring to FIG. 8, the detecting apparatus of this example embodiment may use a parallel beam C. The parallel beam C may have substantially the same cross-sectional area in different positions of the parallel beam C wherein the cross-sections cross the beam perpendicularly to the proceeding direction of the parallel beam C. In order to form the parallel beam C, the collimating lens 125 may be arranged between the light source 120 and the polarizer 130. The collimating lens 125 may convert the fundamental beam F generated from the light source 120 into the parallel beam C. Thus, the parallel beam C may be incident to the polarizer 130.

Because the detecting apparatus may use the parallel beam C, the incident beam I reflected from the filter 140 may be directly incident to the substrate S, not through the objective lens 150. The objective lens 150 may be arranged between the filter 140 and the analyzer 190.

Alternatively, the collimating lens 125 may be applied to the apparatus in FIG. 1 or the apparatus in FIG. 3.

Figure 9:
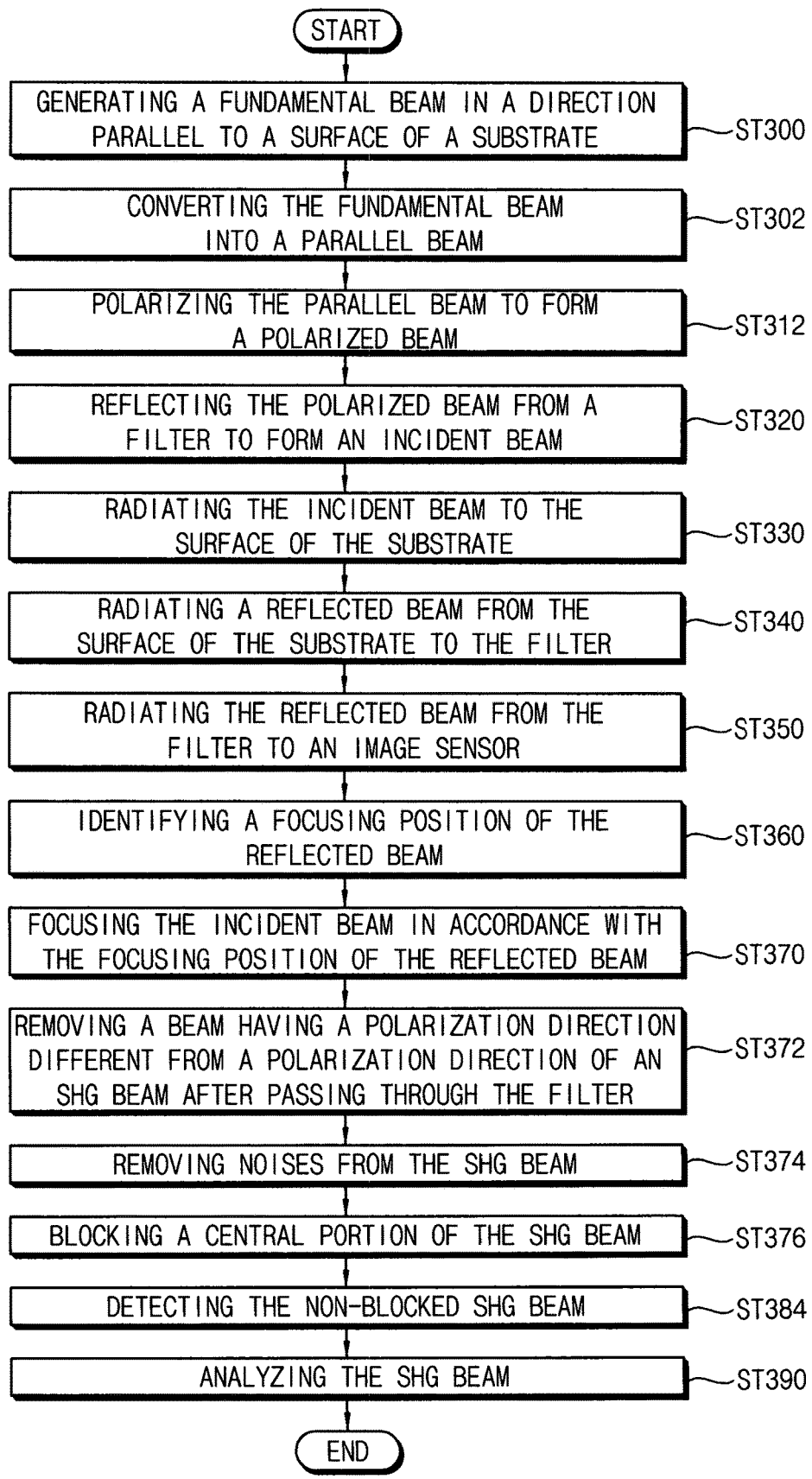

FIG. 9 is a flow chart illustrating a method of detecting a defect on a substrate using the apparatus in FIG. 8.

Referring to FIGS. 8 and 9, in step ST300, the light source 120 may generate the fundamental beam F. The fundamental beam F may radiate/emit in the direction substantially parallel to the surface of the substrate S. The fundamental beam F may have the first frequency w.

In step ST302, the collimating lens 125 may convert the fundamental beam F into the parallel beam C.

In step ST312, the polarizer 130 may polarize the parallel beam C to form the polarized beam P.

The above-mentioned steps ST302 to ST390 with reference to FIG. 6 may be sequentially performed to detect the defect on the substrate S.

Figure 10:
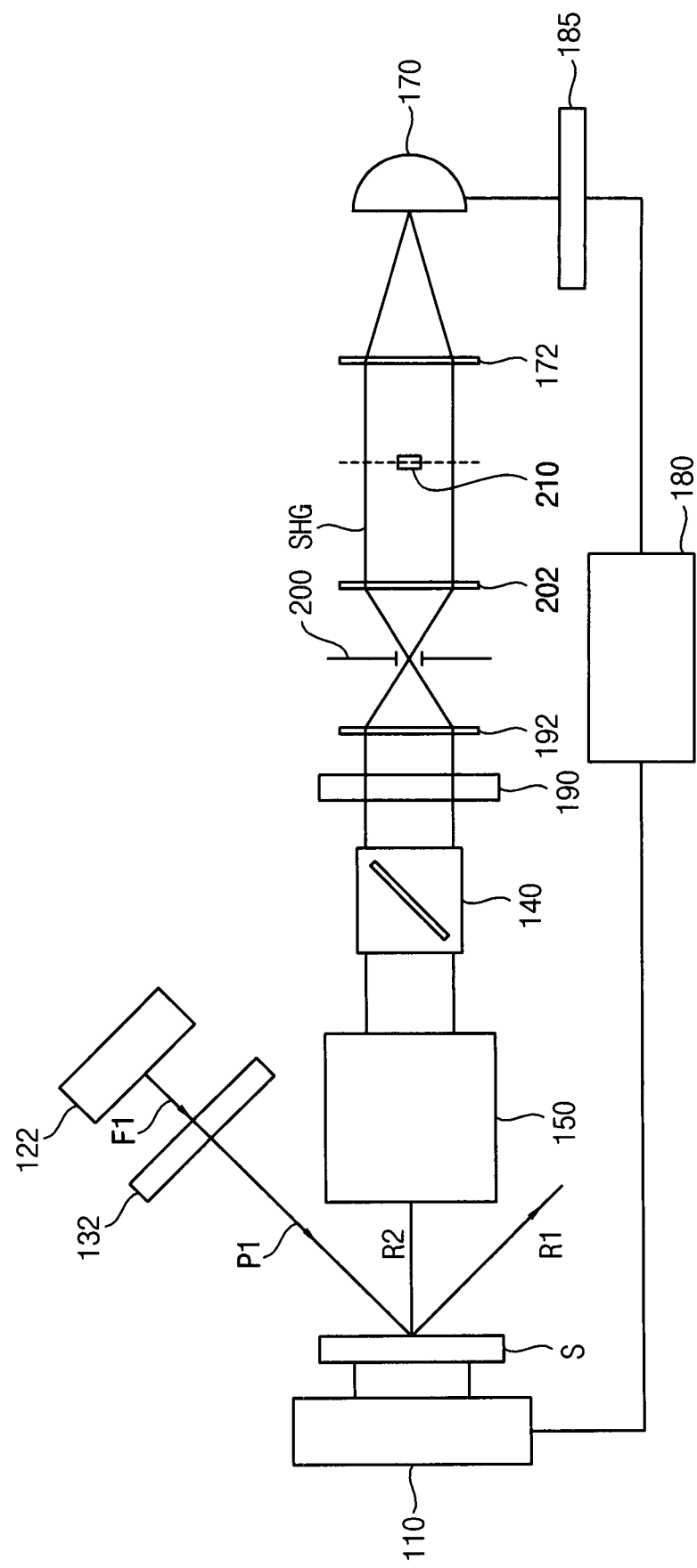

FIG. 10 is a block diagram illustrating an apparatus for detecting a defect on a substrate in accordance with example embodiments.

Referring to FIG. 10, an apparatus for detecting a defect on a substrate may include a stage 110, a light source 122, a polarizer 132, a filter 140, an objective lens 150, an image sensor 160, a detector 170, a controller 180, an analyzer 190, a spatial filter 200 and a blocking plate 210.

The stage 110, the filter 140, the objective lens 150, the image sensor 160, the detector 170, the controller 180, the analyzer 190, the spatial filter 200 and the blocking plate 210 in FIG. 10 may have shapes and functions substantially the same as those of the stage 110, the filter 140, the objective lens 150, the image sensor 160, the detector 170, the controller 180, the analyzer 190, the spatial filter 200 and the blocking plate 210 in FIG. 6, respectively. Thus, any further illustrations with respect to the stage 110, the filter 140, the objective lens 150, the image sensor 160, the detector 170, the controller 180, the analyzer 190, the spatial filter 200 and the blocking plate 210 in FIG. 10 may be omitted herein for brevity.

The light source 122 may generate/emit a fundamental beam F1 in a direction inclined with respect to the surface of the substrate S. Thus, the light source 122 may be arranged inclined to the stage 110. For example, the light source 122 may be positioned to be offset with respect to a top surface of the stage 110.

The polarizer 132 may be arranged between the light source 122 and the filter 140. Because the light source 122 may be inclined to the stage 110, the polarizer 132 may also be inclined to the stage 110. The polarizer 132 may polarize the fundamental beam F1 generated from the light source 122 to form a polarized beam P1 having a polarization direction.

The polarized beam P1 may be directly incident to the surface of the substrate S disposed on the stage 110. A reflected beam R1 generated/reflected from the surface of the substrate S may progress in a direction inclined to the surface of the substrate S. In contrast, a reflected beam R2 generated/reflected from the defect on the substrate S may be incident to the filter 140 through the objective lens 150. While the image sensor 160 is not shown in FIG. 10, the image sensor 160 may be positioned in a place where the image sensor 160 receives the reflected beam R1, and the image sensor 160 may send information of the reflected beam R to the controller 180 to adjust the focus of the incident beam I emitted on the substrate S.

Figure 11:
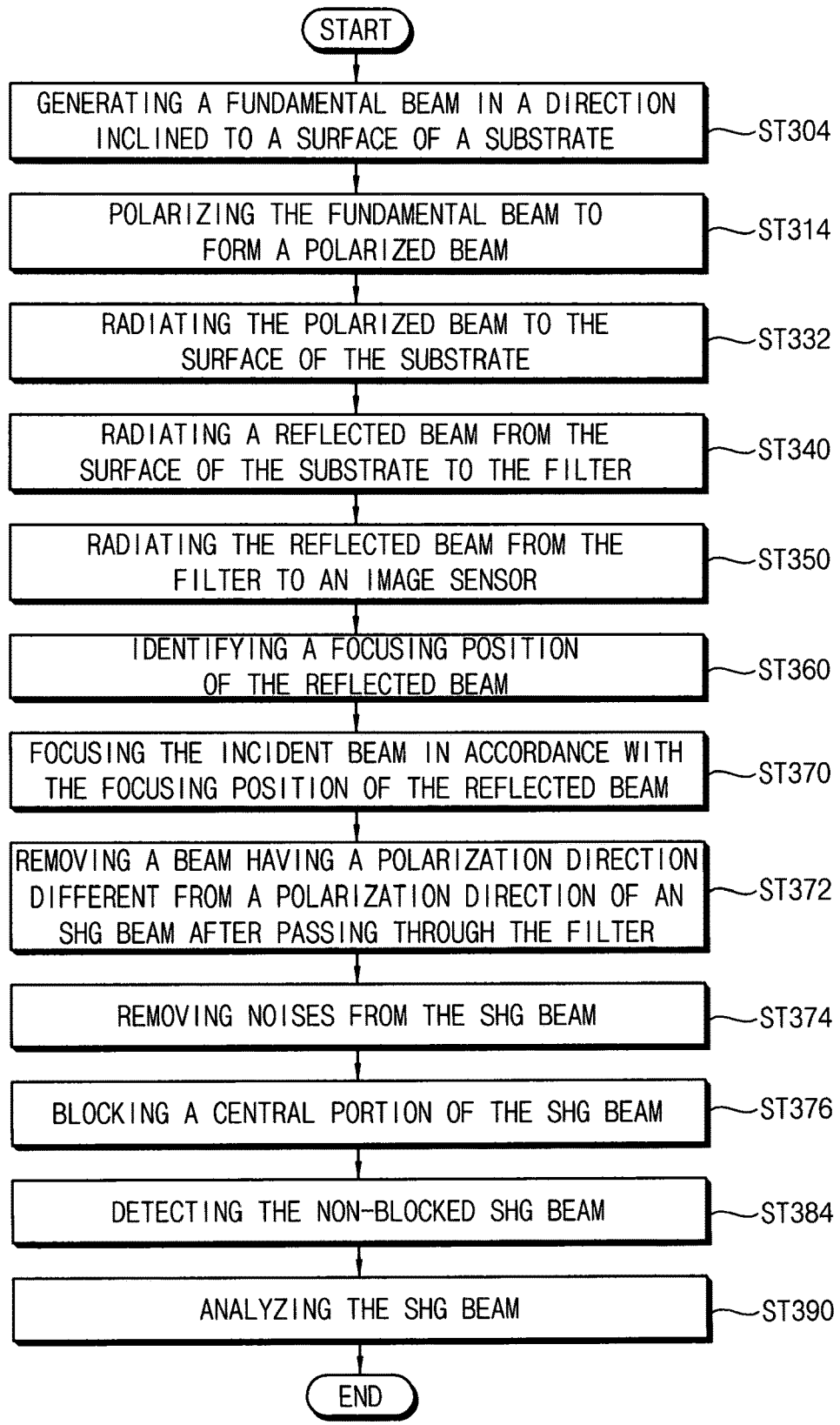

FIG. 11 is a flow chart illustrating a method of detecting a defect on a substrate using the apparatus in FIG. 10.

Referring to FIGS. 10 and 11, in step ST304, the light source 122 may generate/emit the fundamental beam F1 in the direction inclined to the surface of the substrate S.

In step ST314, the polarizer 132 may polarize the fundamental beam F1 to form the polarized beam P1.

In step ST332, the polarized beam P1 may be slantly incident to the surface of the substrate S on the stage 110.

The above-mentioned steps ST340 to ST390 illustrated with reference to FIG. 6 may be sequentially performed to detect the defect on the substrate S.

According to example embodiments, only the SHG beam, which may be caused/generated by the defect on the substrate, among the reflected beams may be detected. Thus, a nano size of the defect may be accurately and rapidly detected by detecting the SHG beam.

A method of manufacturing a semiconductor device according to an embodiment of the present disclosure will be described below.

According to the method of manufacturing a semiconductor device, a substrate may be provided. The substrate may be a semiconductor substrate, for example, a silicon substrate, a germanium substrate or a silicon-germanium substrate. Various semiconductor patterns and various conductor patterns may be formed on the substrate to form circuits including transistors, capacitors and/or switches via a plurality of manufacturing processes including multiple steps of photolithography processes. A defect inspection process described above may be applied before, between and/or after performing the plurality of manufacturing processes including the photolithography processes. In certain embodiments, the defect inspection process may adjust the process conditions using a result of the defect inspection obtained by a method described in the present disclosure. After forming various circuits on the substrate, the substrate may be diced and packaged.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of detecting a defect on a substrate, the method comprising:
    radiating an incident light beam to a surface of the substrate to form reflected light beams; and
    detecting a second harmonic generation (SHG) beam among the reflected light beams,
    wherein the SHG beam is generated by a defect on a substrate, and
    wherein detecting the SHG beam comprises removing, from among the reflected light beams, a reflected light beam having a polarization direction different from a polarization direction of the SHG beam.

2. The method of claim 1, further comprising generating a light beam in a direction substantially parallel to the surface of the substrate,
    wherein the generated light beam results in the incident light beam.

3. The method of claim 2, wherein the generated light beam comprises a spot beam or a line beam.

4. The method of claim 2, wherein the generated light beam has at least one frequency.

5. The method of claim 2, further comprising polarizing the generated light beam to form a polarized light beam.

6. The method of claim 5, further comprising reflecting the polarized light beam toward the surface of the substrate to form the incident light beam incident to the surface of the substrate in a direction substantially perpendicular to the surface of the substrate.

7. The method of claim 1, wherein detecting the SHG beam comprises removing a reflected light beam having a frequency band different from a frequency band of the SHG beam among the reflected light beams.

8. The method of claim 1, wherein detecting the SHG beam comprises removing noise from the SHG beam.

9. The method of claim 1, wherein detecting the SHG beam comprises removing a reflected light beam generated by the surface of the substrate from the reflected light beams.

10. The method of claim 1, further comprising focusing the incident light beam on the surface of the substrate by using the reflected light beams.

11. The method of claim 1, further comprising amplifying the SHG beam.

12. The method of claim 1, further comprising analyzing the SHG beam to obtain information including a position, a size and a property of the defect.

13. A method of detecting a defect on a substrate, the method comprising:
    radiating an incident beam to a surface of the substrate to form reflected beams;
    removing a reflected beam having a frequency band different from a frequency band of a second harmonic generation (SHG) beam generated by the defect among the reflected beams;
    removing a first portion of the SHG beam, the first portion having a polarization direction different from a polarization direction of other portions of the SHG beam; and
    removing a second portion of the SHG beam generated by the surface of the substrate.

14. The method of claim 13, further comprising generating a light beam in a direction substantially parallel to the surface of the substrate,
    wherein the generated light beam results in the incident beam.

15. The method of claim 14, further comprising polarizing the generated light beam to form a polarized beam.

16. The method of claim 15, further comprising reflecting the polarized beam from a filter toward the surface of the substrate to form the incident beam incident to the surface of the substrate in a direction substantially perpendicular to the surface of the substrate.

17. The method of claim 13, wherein detecting the SHG beam comprises removing noise from the SHG beam.

18. The method of claim 13, further comprising amplifying the SHG beam.

19. The method of claim 13, further comprising analyzing the SHG beam to obtain information including a position, a size and a property of the defect.

* * * * *